US012479958B2

(12) United States Patent
Rich et al.

(10) Patent No.: US 12,479,958 B2
(45) Date of Patent: Nov. 25, 2025

(54) BLEND OF POLYARYLETHER KETONE COPOLYMER

(71) Applicant: SYENSQO SPECIALTY POLYMERS USA, LLC, Alpharetta, GA (US)

(72) Inventors: Jason Rich, Roswell, GA (US); Mohammad Jamal El-Hibri, Atlanta, GA (US)

(73) Assignee: SYENSQO SPECIALTY POLYMERS USA, LLC, Alpharetta, GA (US)

( * ) Notice: Subject to any disclaimer, the term of this patent is extended or adjusted under 35 U.S.C. 154(b) by 757 days.

(21) Appl. No.: 17/775,563

(22) PCT Filed: Nov. 5, 2020

(86) PCT No.: PCT/EP2020/081215
§ 371 (c)(1),
(2) Date: May 9, 2022

(87) PCT Pub. No.: WO2021/089747
PCT Pub. Date: May 14, 2021

(65) Prior Publication Data
US 2023/0287176 A1    Sep. 14, 2023

Related U.S. Application Data

(60) Provisional application No. 62/932,767, filed on Nov. 8, 2019.

(30) Foreign Application Priority Data

Jan. 21, 2020 (EP) ..................................... 20153006

(51) Int. Cl.
| | | |
|---|---|---|
| C08L 71/10 | (2006.01) | |
| C08G 65/40 | (2006.01) | |
| C08L 79/08 | (2006.01) | |

(52) U.S. Cl.
CPC .......... *C08G 65/4012* (2013.01); *C08L 71/10* (2013.01); *C08L 79/08* (2013.01); C08G 2650/40 (2013.01); C08G 2650/50 (2013.01); C08L 2201/08 (2013.01); C08L 2203/30 (2013.01)

(58) Field of Classification Search
None
See application file for complete search history.

(56) References Cited

U.S. PATENT DOCUMENTS

| | | |
|---|---|---|
| 5,662,170 A | 9/1997 | Donovan et al. |
| 6,085,799 A | 7/2000 | Kodaissi et al. |
| 6,123,114 A | 9/2000 | Seguin et al. |
| 6,655,456 B1 | 12/2003 | Yokley et al. |
| 6,863,124 B2 | 3/2005 | Araux et al. |
| 7,874,356 B2 | 1/2011 | Corre et al. |
| 10,119,023 B2 | 11/2018 | Weinberg et al. |
| 2010/0239441 A1 | 9/2010 | Bade et al. |
| 2012/0234603 A1 | 9/2012 | Vail, III |
| 2018/0282542 A1 | 10/2018 | Chaplin et al. |
| 2019/0136055 A1 | 5/2019 | El-Hibri |
| 2023/0287176 A1* | 9/2023 | Rich ........................ C08L 79/08 |
| 2023/0416486 A1* | 12/2023 | Di Nicolo' ............ B01D 71/76 |

FOREIGN PATENT DOCUMENTS

| | | | |
|---|---|---|---|
| WO | 2001061232 A1 | | 8/2001 |
| WO | 2010112435 A1 | | 10/2010 |
| WO | 2014177392 A1 | | 11/2014 |
| WO | 2017186922 A1 | | 11/2017 |
| WO | WO2017186926 | * | 11/2017 |
| WO | 2018086873 A1 | | 5/2018 |
| WO | 2019053238 A1 | | 3/2019 |
| WO | 2019053239 A1 | | 3/2019 |

OTHER PUBLICATIONS

International Search Report issued in International Application No. PCT/EP2020/081214, mailed Feb. 5, 2021 (3 pages).
Written Opinion issued in International Application No. PCT/EP2020/081214, mailed Feb. 5, 2021 (5 pages).
Murphy, J., "Additives for Plastics Handbook," Elsevier Advanced Technology, 2nd Edition, pp. 43-48, 2001 (8 pages).
International Search Report issued in corresponding International Application No. PCT/EP2020/081215; dated Jan. 22, 2021 (3 pages).
Written Opinion of the International Searching Authority issued in corresponding International Application No. PCT/EP2020/081215; dated Jan. 22, 2021 (5 pages).

* cited by examiner

*Primary Examiner* — David J Buttner
(74) *Attorney, Agent, or Firm* — Osha Bergman Watanabe & Burton LLP

(57) ABSTRACT

This invention pertains to novel compositions of polyarylether ketone copolymers and polyetherimides having improved thermal resistance and mechanical properties, to a method of making the same, and to the use thereof in various fields.

18 Claims, No Drawings

BLEND OF POLYARYLETHER KETONE COPOLYMER

CROSS-REFERENCE TO RELATED APPLICATIONS

This application claims priorities to earlier US Provisional Application filed on 8 Nov. 2019 with No. 62/932,767 and to earlier European Patent Application filed on 21 Jan. 2020 with No. 20153006.0, the whole content of these applications being incorporated herein by reference for all purposes.

TECHNICAL FIELD

This invention pertains to novel compositions of polyarylether ketone copolymers and polyetherimides having improved thermal resistance and mechanical properties, to a method of making the same, and to the use thereof in various fields, including notably as thermoplastic matrices for continuous fiber composites.

BACKGROUND ART

Polyaryl ether ketone materials are known as high performance plastics with high thermal resistance, which are used for a number of industrial applications where resistance to extreme conditions is required.

For instance, oil and gas exploration (O&G) requires materials able to resist high temperature and pressure, and capable of maintaining the required performances upon prolonged exposure in the said extreme pressure and temperature conditions to aggressive chemicals present in downhole environment, including notably salt water, hydrocarbons, $CO_2$, $H_2S$, etc.

Still, in the area where thermoplastic composites are used, including O&G, aerospace, automotive and the like, matrices are similarly required to withstand high temperatures conditions, while, on top of this, due to the specificities of thermoplastic composites processing, fast kinetics of crystallization are required.

In this area, hence polyether ether ketone (PEEK), having characterizing recurring unit of formula —O-Ph-O-Ph-CO-Ph-, with Ph=para-phenylene, has found broad utility, thanks to its crystalline melting point of about 340° C. enabling acceptable processing, although its glass transition temperature of about 150° C. is somewhat limiting its ability to withstand continuous operations at temperatures of 150° C. or beyond.

Hence, copolymers comprising a mixture of units —O-Ph-O-Ph-CO-Ph- (PEEK) and —O-Ph-Ph-O-Ph-CO-Ph- (PEDEK) have been proposed, as an attempt to provide materials possessing increased $T_g$ over PEEK, while still exhibiting acceptable processing characteristics.

In this area, WO 2018/086873 discloses PEDEK-rich PEDEK-PEEK copolymers endowed with high temperature and excellent chemical resistance and mechanical properties. Their use in high temperature applications is limited, however, by their glass transition temperatures ($T_g$) of about 170° C. While the crystallinity of PEDEK-PEEK allows use above 170° C., the strength and modulus is substantially reduced at these elevated temperatures. Now, some applications require the chemical resistance and other attributes of PEDEK-PEEK copolymers, but with even greater mechanical stiffness and strength at temperatures above 170° C. than can be provided by the PEDEK-PEEK copolymers.

With the limitations of these PEDEK-PEEK copolymers, there is hence an unmet need for polyaryl ether ketone-based materials that can provide higher temperature performance and improved mechanical properties than can be achieved with PEDEK-PEEK copolymers.

Blending different polymers, aimed at creating new materials altering the thermal, mechanical and impact properties without chemical modification, is an approach which has been already pursued in the domain of polyaryl ether ketone. In addition, physical properties may be altered by blending, through modification of crystallization behaviour of one or more of the blend components.

It has been known for decades, for instance, to blend a polyetherimide (PEI) into a PEEK polymer to improve, at least to a certain extent, the mechanical properties of PEEK in a certain temperature range; nevertheless, the utility of this blend is limited due to the full miscibility of PEI and PEEK, which markedly reduces the crystallinity of PEEK as well as the crystallization rates, making such blends non-viable in injection molding processing, and also compromising the mechanical properties above the $T_g$ due to a disproportionate reduction in crystallinity. For these reasons, PEEK/PEI blends have not found significant commercial use today despite being known and studied extensively for several decades.

There is hence a continuous quest in the art for polyaryl ether ketone polymers possessing an advantageous combination of thermal rating/thermal performances and chemical resistance, while maintaining outstanding mechanical performances, so as to provide materials suitable for being used in extremely demanding application, such as notably as matrices for thermoplastic continuous fiber composites.

The polymer blends of PEDEK-rich PEDEK-PEEK copolymer and PEI according to this invention address this unmet need.

Document WO2019/053238, which is generally directed to use of powdered blends of (i) PEEK-type materials possessing at least 50% moles of units of formula —O-Ph-O-Ph-CO-Ph- (PEEK units) and (ii) poly(ether imide) (PEI) in Selective Laser Sintering (SLS) methods, further teaches that said PEEK-type materials may possibly be PEEK copolymers, further comprising units of formula —O-Ph-Ph-O-Ph-CO-Ph-, i.e. PEDEK units, although in minor amount. According to these teachings, the blending of PEI into PEEK polymers is such to improve the recyclability and thermal stability in SLS processing conditions of the powdered blend thereof. Now, the Applicant has found that incorporation of PEI in such PEEK-rich PEEK-PEDEK copolymers is not effective in delivering the targeted behaviour; in particular, as the working and non-working embodiments will demonstrate, the addition of PEI into comparative PEEK-rich PEEK-PEDEK copolymers is causing slower crystallization kinetics, which is rather opposite findings than those associated to the inventive compositions.

SUMMARY OF INVENTION

It is hence a first object of the present invention a composition [composition (C)] comprising:
  at least one polyaryl ether ketone copolymer [copolymer (PEDEK-PEEK)] comprising:

recurring units ($R_{PEEK}$) of formula (I):

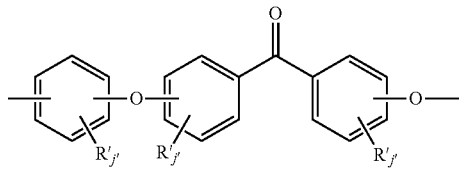

Formula (I)

recurring units ($R_{PEDEK}$) of formula (II):

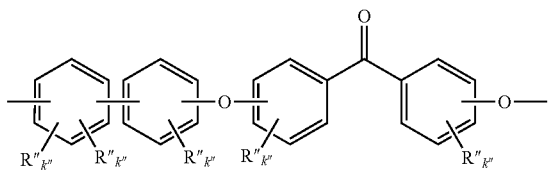

Formula (II)

wherein in above formulae (I) and (II), each of R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of j' and k", equal to or different from each other, is independently selected at each occurrence from 0 and an integer of 1 to 4;

wherein the said recurring units are comprised in a molar ratio ($R_{PEDEK}$): ($R_{PEEK}$) of 55:45 to 99:1, and at least one poly(ether imide) polymer comprising at least 50 mol. %, based on the total number of moles in the polymer, of recurring units ($R_{PEI}$) comprising (i) at least one aromatic ring, (ii) at least one imide group, in its imide and/or in its amic acid form, and (iii) at least one ether group [polymer (PEI)].

The invention further pertains to a method of manufacturing the said composition (C), said method comprising blending in the molten state the said copolymer (PEDEK-PEEK) and the said polymer (PEI).

The invention further notably pertains to a method of making thermoplastic composites, and/or for producing parts included in devices useful in various fields, including molding those parts from the inventive composition (C) as above detailed.

The Applicant has found that the inventive composition (C), as above detailed, thanks to the predominance of PEDEK-type units in the copolymer (PEDEK-PEEK), and to the blending with polymer (PEI), is effective in delivering superior strength and stiffness at high temperature.

Without being bound by this theory, the Applicant believes that the addition of a polymer (PEI) to a copolymer (PEDEK-PEEK) surprisingly results in a partially miscible blend, or otherwise said, a highly compatible blend, with consequent improved strength and stiffness at high temperatures compared to neat PEDEK-PEEK copolymers and PEEK/PEI blends. The partial miscibility behaviour of PEDEK-PEEK copolymer blends with PEI, which has been notably evidenced by measurements of the glass transition temperature ($T_g$) as obtained from Dynamic Mechanical Analysis (DMA) measurements, is unexpected and advantageous, and it facilitates the improvements in mechanical properties at high temperatures (including above the $T_g$ of the blend). It also allows melt processing the blend as one homogeneous blend, in particular in certain ranges of the composition range (for example up to 35 wt. % PEI). This eliminates the potential complicating factors associated with many heterogeneous two-phase blends which can exhibit unstable and variable phase domain sizes and morphology which often translate to variability in physical and mechanical properties of the blend. Finally, while it is well known that addition of PEI to PEEK slows the crystallization of PEEK (due to full miscibility of the two polymers), blending PEDEK-PEEK copolymer with PEI increases the speed of crystallization, which, in addition to being unexpected and surprising, is beneficial for efficient processing in injection molding and other operations, including for making and processing thermoplastic continuous fiber composite materials and parts.

DESCRIPTION OF EMBODIMENTS

The Copolymer (PEDEK-PEEK)

The copolymer (PEDEK-PEEK) comprises recurring units ($R_{PEDEK}$) and ($R_{PEEK}$) as above detailed in molar ratio ($R_{PEDEK}$):($R_{PEEK}$) of 55:45 to 99:1, preferably of 60:40 to 95:5, more preferably of 65:35 to 90:10, and even more preferably of 68:32 to 80:20. Copolymers (PEDEK-PEEK) which have been found particularly advantageous are those comprising recurring units ($R_{PEDEK}$) and ($R_{PEEK}$) as above detailed in molar ratio of ($R_{PEDEK}$):($R_{PEEK}$) of 70:30 to 80:20.

In copolymer (PEDEK-PEEK), the sum of the amount of recurring units ($R_{PEDEK}$) and ($R_{PEEK}$) is generally of at least 70% moles, preferably at least 80% moles, even more preferably at least 90% moles, and most preferably at least 95% moles, with respect to the total number of moles of recurring units.

The copolymer (PEDEK-PEEK) may additionally comprise recurring units ($R_{PAEK}$) different from recurring units ($R_{PEEK}$) and ($R_{PEDEK}$), as above detailed.

In such case, the amount of recurring units ($R_{PAEK}$) is generally comprised between 0 and 5% moles, with respect to the total number of moles of recurring units of copolymer (PEDEK-PEEK), while recurring units ($R_{PEEK}$) and ($R_{PEDEK}$) will be present in an amount of at least 95% moles, with respect to the total number of moles of recurring units of copolymer (PEDEK-PEEK).

When recurring units ($R_{PAEK}$) different from recurring units ($R_{PEEK}$) and ($R_{PEDEK}$) are present in the copolymer (PEDEK-PEEK), these recurring units ($R_{PAEK}$) generally comply with any of the following formulae (K-A) to (K-M) herein below:

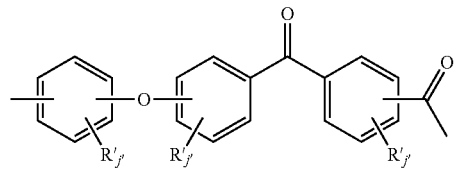

(K-A)

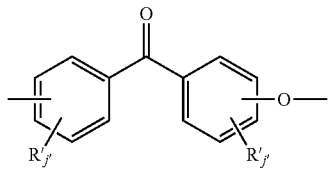

(K-B)

-continued
(K-C)
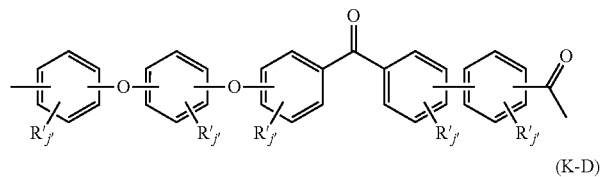
(K-D)
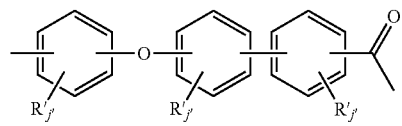
(K-E)
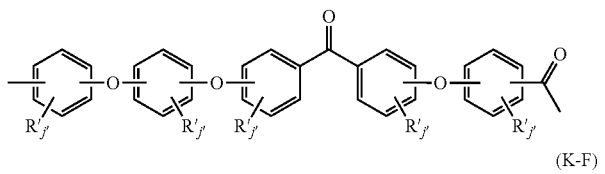
(K-F)
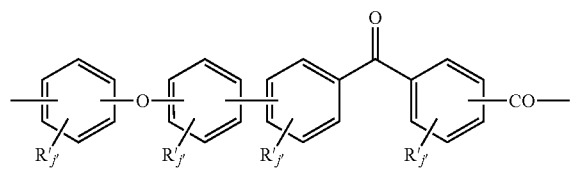
(K-G)
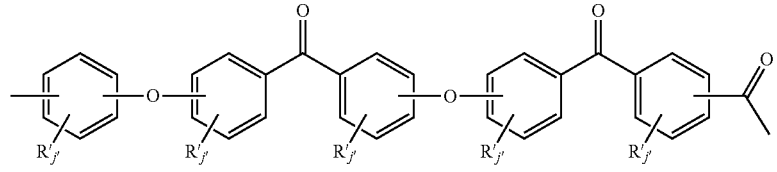
(K-H)
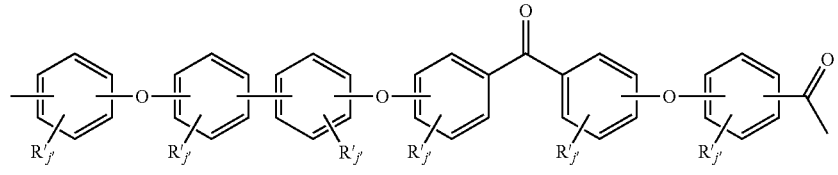
(K-I)
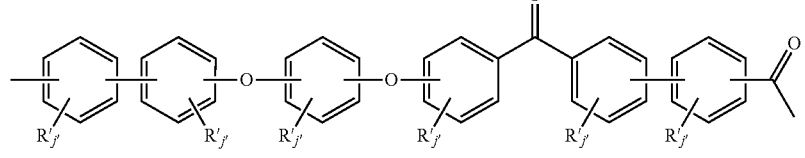
(K-J)
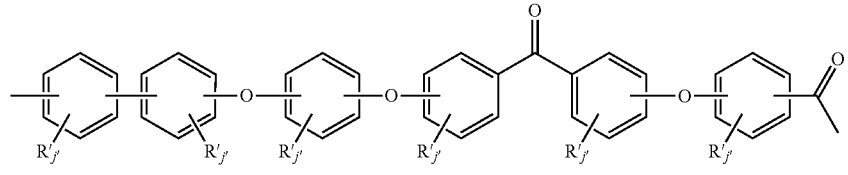
(K-K)
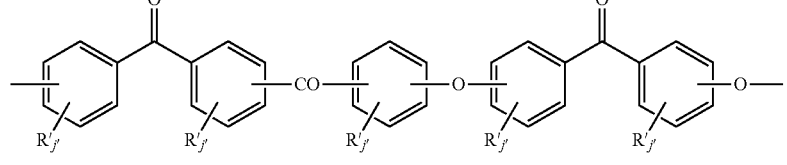
(K-L)
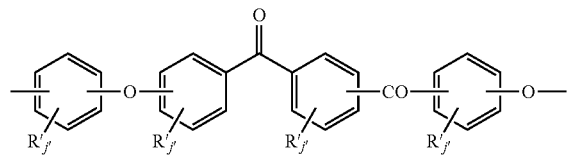
(K-M)
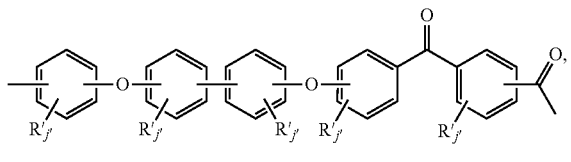

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

It is nevertheless generally preferred for the copolymer (PEDEK-PEEK) of to be essentially composed of recurring units ($R_{PEEK}$) and ($R_{PEDEK}$), as above detailed. The expression "essentially composed of", in connection with copolymer (PEDEK-PEEK) is meant to indicate that defects, end groups and monomers' impurities may be incorporated in very minor amounts in the copolymer (PEDEK-PEEK), so as to advantageously not affect negatively the performances of the same in the inventive blend.

In recurring units ($R_{PEEK}$) of formula (I), the connections among phenyl groups are generally in the para positions of each of the phenyl rings. Further, it is generally preferred for each of j' to be zero, or in other words, for each of the phenyl rings not to bear any further substituents in addition to the catenary ethereal or ketone bridging groups. According to these preferred embodiments, recurring units ($R_{PEEK}$) comply with formula (Ia):

Formula (Ia)

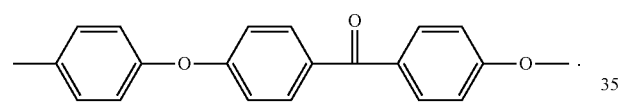

Similarly, in recurring units ($R_{PEDEK}$) of formula (II), the connections among phenyl groups are generally in the para positions of each of the phenyl rings. Further, it is generally preferred for each of k" to be zero, or in other words, for each of the phenyl rings not to bear any further substituents in addition to the catenary ethereal or ketone bridging groups. According to these preferred embodiments, recurring units ($R_{PEDEK}$) Comply with formula (IIb):

Formula (IIb)

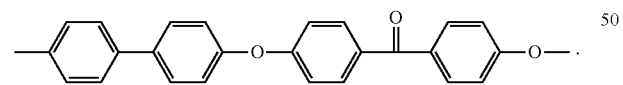

Poly(Ether Imide) [Polymer (PEI)]

As said, polymer (PEI) denotes is a polymer comprising at least 50 mol. %, based on the total number of moles in the polymer, of recurring units ($R_{PEI}$) comprising at least one aromatic ring, at least one imide group, as such and/or in its amic acid form, and at least one ether group. Recurring units ($R_{PEI}$) may optionally further comprise at least one amide group which is not included in the amic acid form of an imide group.

Generally, the recurring units ($R_{PEI}$) are selected from the group consisting of following formulas (I), (II), (III), (IV), (V) and mixtures thereof:

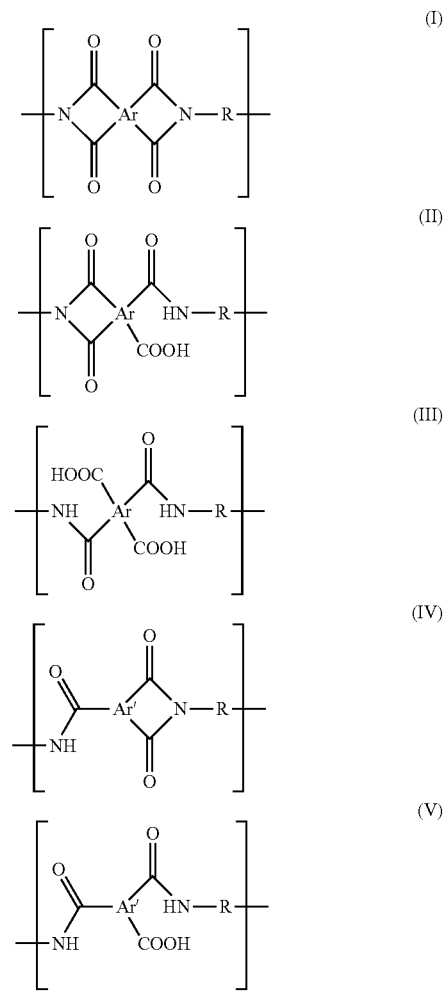

where
Ar is a tetravalent aromatic moiety and is selected from the group consisting of a substituted or unsubstituted, saturated, unsaturated or aromatic monocyclic and polycyclic group having 5 to 50 carbon atoms;

Ar' is a trivalent aromatic moiety and is selected from the group consisting of a substituted, unsubstituted, saturated, unsaturated, aromatic monocyclic and aromatic polycyclic group having from 5 to 50 C atoms; and R is selected from the group consisting of substituted and unsubstituted divalent organic radicals, for example selected from the group consisting of
(a) aromatic hydrocarbon radicals having 6 to 20 carbon atoms and halogenated derivatives thereof;
(b) straight or branched chain alkylene radicals having 2 to 20 carbon atoms;
(c) cycloalkylene radicals having 3 to 20 carbon atoms, and
(d) divalent radicals of formula (VI):

(VI)

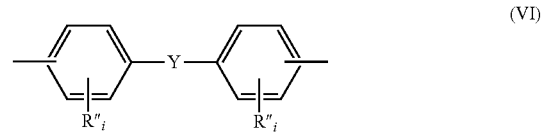

where
Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the proviso that at least one of Ar, Ar' and R comprise at least one ether group and that the ether group is present in the polymer chain backbone.

In above formulae, Ar is typically selected from the group consisting of formulae:

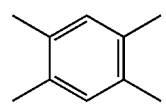

(VII)

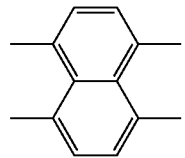

(VIII)

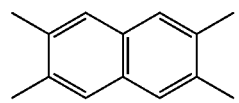

(IX)

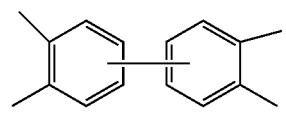

(X)

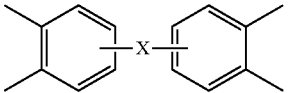

(XI)

where
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;

or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

In above formulae, Ar' is typically selected from the group consisting of formulae:

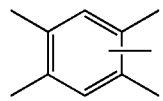

(XII)

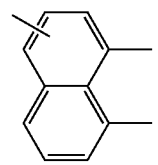

(XIII)

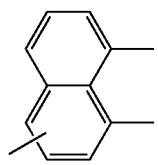

(XIV)

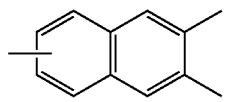

(XV)

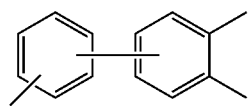

(XVI)

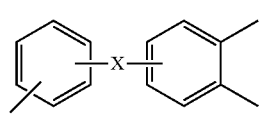

(XVII)

where
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;

or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

Generally, at least 50 mol. %, at least 60 mol. %, at least 70 mol. %, at least 80 mol. %, at least 90 mol. %, at least 95 mol. %, at least 99 mol. % or all of the recurring units in the polymer (PEI) are recurring units (R$_{PEI}$) of formulas (I), (II), (III), (IV), (V) and/or mixtures thereof, as defined above.

According to certain embodiment, polymer (PEI) is a polymer comprising at least 50 mol. %, based on the total number of moles in the polymer, of recurring units (R$_{PEI}$) of formula (VII):

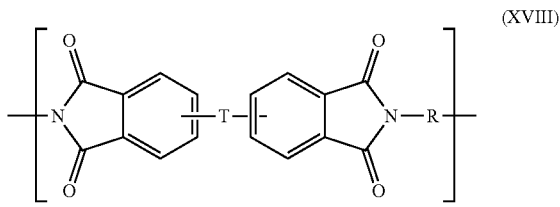

(XVIII)

where
R is selected from the group consisting of substituted and unsubstituted divalent organic radicals, for example selected from the group consisting of
(a) aromatic hydrocarbon radicals having 6 to 20 carbon atoms and halogenated derivatives thereof;
(b) straight or branched chain alkylene radicals having 2 to 20 carbon atoms;
(c) cycloalkylene radicals having 3 to 20 carbon atoms, and
(d) divalent radicals of formula (VI):

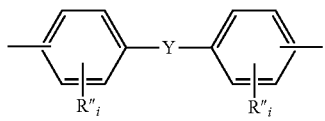

(VI)

where
Y is selected from the group consisting of alkylenes of 1 to 6 carbon atoms, for example $-C(CH_3)_2-$ and $-C_nH_{2n}-$ (n being an integer from 1 to 6); perfluoroalkylenes of 1 to 6 carbon atoms, for example $-C(CF_3)_2-$ and $-C_nF_{2n}-$ (n being an integer from 1 to 6); cycloalkylenes of 4 to 8 carbon atoms; alkylidenes of 1 to 6 carbon atoms; cycloalkylidenes of 4 to 8 carbon atoms; $-O-$; $-S-$; $-C(O)-$; $-SO_2-$; $-SO-$, and
R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and
i, for each R", is independently zero or an integer ranging from 1 to 4, with the proviso that at least one of Ar, Ar' and R comprise at least one ether group and that the ether group is present in the polymer chain backbone.
T can either be
$-O-$ or $-O-Ar"-O-$
wherein the divalent bonds of the $-O-$ or the $-O-Ar"-O-$ group can be in the 3,3', 3,4', 4,3', or the 4,4' positions, wherein Ar" is a aromatic moiety selected from the group consisting of a substituted or unsubstituted, saturated, unsaturated or aromatic monocyclic and polycyclic group having 5 to 50 carbon atoms, for example a substituted or unsubtitutated phenylene, a substituted or unsubtitutated cyclohexyl group, a substituted or unsubstituted biphenyl group, a substituted or unsubstituted naphtalene group or a moiety comprising two substituted or unsubtitutated phenylene.
According to an embodiment of the present disclosure, Ar" is of the general formula (VI), as detailed above; for example, Ar" is of formula (XIX):

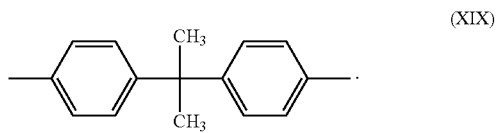

(XIX)

The polymer (PEI) according to this preferred embodiment may be prepared by any of the methods well-known to those skilled in the art including the reaction of a diamino compound of the formula $H_2N-R-NH_2$ (XX), where R is as defined before, with any aromatic bis(ether anhydride)s of the formula (XXI):

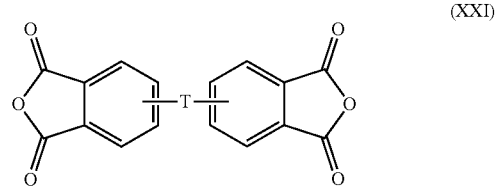

(XXI)

where T as defined before.
In general, the preparation can be carried out in solvents, e.g., o-dichlorobenzene, m-cresol/toluene, N,N-dimethylacetamide, at temperatures ranging from 20° C. to 250° C.
Alternatively, these polymer (PEI) can be prepared by melt polymerization of any dianhydrides of formula (XXI) with any diamino compound of formula (XX) while heating the mixture of the ingredients at elevated temperatures with concurrent intermixing.
The aromatic bis(ether anhydride)s of formula (XXI) include, for example: 2,2-bis[4-(2,3-dicarboxyphenoxy) phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy) diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; 2,2-bis[4 (3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis (3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; and mixtures of such dianhydrides.
The organic diamines of formula (XX) are chosen from the group consisting of m-phenylenediamine, p-phenylenediamine, 2,2-bis(p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine, and mixtures thereof; preferably, the organic diamines of formula (XX) are chosen from the group consisting of m-phenylenediamine and p-phenylenediamine and mixture thereof.
According to certain preferred embodiments, polymer (PEI) is a polymer comprising at least 50 mol. %, based on the total number of moles in the polymer, of recurring units ($R_{PEI}$) of formulas (XXIII) or (XXIV), in imide forms, or their corresponding amic acid forms and mixtures thereof:

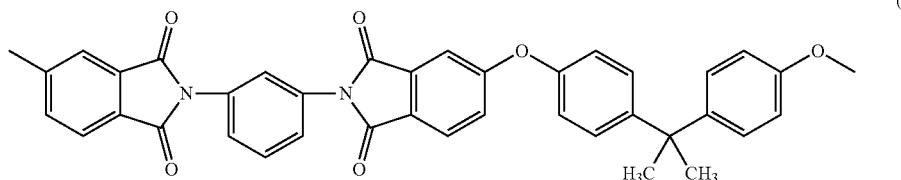

(XXIII)

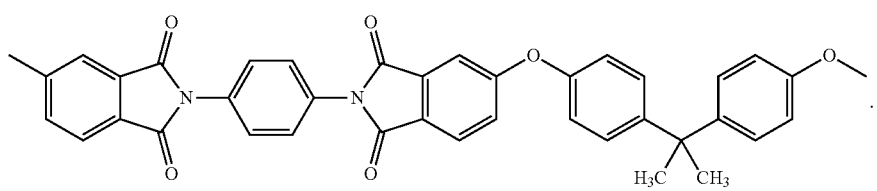

(XXIV)

In a preferred embodiment, at least 50 mol. %, at least 60 mol. %, at least 70 mol. %, at least 80 mol. %, at least 90 mol. %, at least 95 mol. %, at least 99 mol. % or all of the recurring units in the PEI are recurring units ($R_{PE}I$) of formulas (XXIII) or (XXIV), in imide forms, or their corresponding amic acid forms and mixtures thereof.

Such aromatic polyimides are notably commercially available from Sabic Innovative Plastics as ULTEM® polyetherimides.

Composition Comprising the Copolymer (PEDEK-PEEK) and the Polymer (PEI)

The composition (C) comprises at least one copolymer (PEDEK-PEEK): it may comprise one or more than one copolymer (PEDEK-PEEK), e.g. a multiplicity of copolymers (PEDEK-PEEK) which may differ because of their respective molecular weight (RV, MV . . . ), or because of the nature of their recurring units, or for whichever other parameter, including combinations thereof.

Similarly, the composition (C) comprises at least one polymer (PEI): it may comprise one or more than one polymer (PEI), e.g. a multiplicity of polymers (PEI) which may differ because of their respective molecular weight (RV, MV . . . ), or because of the nature of their recurring units, or for whichever other parameter, including combinations thereof.

The composition (C) may comprise copolymer (PEDEK-PEEK), as above detailed, in a weight amount of at least 40%, preferably at least 50%, more preferably at least 60% or even at least 65%, based on the combined weight of the copolymer (PEDEK-PEEK) and polymer (PEI) and/or in a weight amount of at most 95%, preferably at most 90%, based on the combined weight of the copolymer (PEDEK-PEEK) and polymer (PEI).

Conversely, composition (C) may comprise polymer (PEI), as above detailed, in a weight amount of less than 60%, less than 50%, less than 40% or less than 35%, based on the combined weight of the copolymer (PEDEK-PEEK) and polymer (PEI) and/or in a weight amount of at least 5%, preferably at least 10%, based on the combined weight of the copolymer (PEDEK-PEEK) and polymer (PEI).

Particularly preferred are those compositions (C) whereas copolymer (PEDEK-PEEK) is present in a major amount with respect to the blend of the copolymer (PEDEK-PEEK) and polymer (PEI); according to these preferred embodiments, composition (C) comprises:

copolymer (PEDEK-PEEK), as above detailed, in a weight amount of more than 50%, preferably of at least 60%, more preferably of at least 65%, based on the combined weight of the copolymer (PEDEK-PEEK) and polymer (PEI); and/or in a weight amount of at most 95%, preferably at most 90%, based on the combined weight of the copolymer (PEDEK-PEEK) and polymer (PEI);

polymer (PEI), as above detailed, in a weight amount of less than 50%, preferably of at most 40%, more preferably of at most 35% based on the combined weight of the copolymer (PEDEK-PEEK) and polymer (PEI); and/or in a weight amount of at least 5%, preferably at least 10%, based on the combined weight of the copolymer (PEDEK-PEEK) and polymer (PEI).

Good results have been obtained for compositions (C) comprising copolymer (PEDEK-PEEK) in an amount of 60 to 90% and polymer (PEI) in an amount of 10 to 40%, based on the combined weight of the copolymer (PEDEK-PEEK) and polymer (PEI).

According to certain embodiments, the composition (C) comprises the copolymer (PEDEK-PEEK) and polymer (PEI), as above detailed, in a combined weight amount of at least 90%, if not at least 95%, based on the total weight of the said composition (C). Yet, embodiments are provided wherein the composition (C) consists essentially of the copolymer (PEDEK-PEEK) and polymer (PEI), as above detailed. For the purpose of the present invention, the expression "consisting essentially of" is to be understood to mean that any additional component different from the copolymer (PEDEK-PEEK) and polymer (PEI), as above detailed, is present in an amount of at most 1% by weight, based on the total weight of the composition (C), so as not to substantially alter advantageous properties of the composition.

Nevertheless, the composition (C) is often formulated with additional ingredients beside copolymer (PEDEK-PEEK) and polymer (PEI). Hence, according to certain other embodiments, the composition (C) comprises, in addition to copolymer (PEDEK-PEEK) and polymer (PEI), at least one additional ingredient in an amount of advantageously at least 10% wt and of at most 60% wt, based on the overall weight of the composition (C).

The composition (C) may, for instance, further comprise at least one reinforcing filler. Reinforcing fillers are well known by the skilled in the art. They are preferably selected from fibrous and particulate fillers. Fibrous fillers may be added to the composition (C) as chopped fibers or as continuous fibers, including under the form of fabrics.

More preferably, the reinforcing filler is selected from mineral fillers (such as talc, mica, kaolin, calcium carbonate, calcium silicate, magnesium carbonate, boron nitride), glass fibers, carbon fibers, synthetic polymeric fiber, aramid fiber, aluminum fiber, titanium fibers, magnesium fibers, boron carbide fibers, rock wool fibers, steel fibers, wollastonite, nanomaterials (such as single-walled or multi-walled carbon nanotubesn carbon nanofibers, grapheme, nanoclays, such as montmorillonite) etc. Still more preferably, it is selected from mica, kaolin, calcium silicate, magnesium carbonate, glass fibers, carbon fibers and wollastonite etc.

Preferably, the filler is chosen from fibrous fillers. A particular class of fibrous fillers consists of whiskers, i.e. single crystal fibers made from various raw materials, such as $Al_2O_3$, SiC, BC, Fe and Ni.

In one embodiment of the present invention the reinforcing filler is chosen from wollastonite and glass fibers. Among fibrous fillers, glass fibers are preferred; they include chopped strand A-, E-, C-, D-, S-, T- and R-glass fibers, as described in chapter 5.2.3, p. 43-48 of Additives for Plastics Handbook, $2^{nd}$ edition, John Murphy.

Glass fibers optionally comprised in polymer composition (C) may have a circular cross-section or a non-circular cross-section (such as an oval or rectangular cross-section). When the glass fibers used have a circular cross-section, they preferably have an average glass fiber diameter of 3 to 30 μm and particularly preferred of 5 to 12 μm. Different sorts of glass fibers with a circular cross-section are available on the market depending on the type of the glass from which they are made. One may notably cite glass fibers made from E- or S-glass.

In another embodiment of the present invention the reinforcing filler is a carbon fiber.

As used herein, the term "carbon fiber" is intended to include graphitized, partially graphitized and ungraphitized carbon reinforcing fibers or a mixture thereof. Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials. The term "graphite fiber" intends to denote carbon fibers obtained by high temperature pyrolysis (over 2000° C.) of carbon fibers, wherein the carbon atoms place in a way similar to the graphite structure. Carbon fibers useful for the present invention are preferably chosen from the group composed of PAN-based carbon fibers, pitch based carbon fibers, graphite fibers, and mixtures thereof.

The weight of said reinforcing filler is advantageously below 60% wt., more preferably below 50% wt., even more preferably below 45% wt., most preferably below 35% wt., based on the total weight of the composition (C).

Preferably, the reinforcing filler is present in an amount ranging from 10 to 60% wt., preferably from 20 to 50% wt., preferably from 25 to 45% wt., most preferably from 25 to 35% wt., based on the total weight of the composition (C).

The reinforcing filler can also be a nanomaterial such as single-walled or multi-walled carbon nanotubes, carbon nanofibers, graphene, a nanoclay such as montmorillonite, or any other nanofiller known in the art.

The composition (C) may further optionally comprise one or more than one additional ingredient (I) different from the reinforcing filler and from the copolymer (PEDEK-PEEK) and polymer (PEI), as above detailed, generally selected from the group consisting of (i) colorants such as notably a dye (ii) pigments such as notably titanium dioxide, zinc sulfide and zinc oxide (iii) light stabilizers, e.g. UV stabilizers (iv) heat stabilizers (v) antioxidants such as notably organic phosphites and phosphonites, (vi) acid scavengers (vii) processing aids (viii) crystallization nucleating agents (ix) internal lubricants and/or external lubricants (x) flame retardants (xi) smoke-suppressing agents (x) anti-static agents (xi) anti-blocking agents (xii) conductivity additives such as notably carbon black and carbon nanofibers (xiii) plasticizers (xiv) flow modifiers (xv) extenders (xvi) metal deactivators and combinations comprising one or more of the foregoing additives.

When one or more than one additional ingredient (I) are present, their total weight, based on the total weight of polymer composition (C), is usually below 20%, preferably below 10%, more preferably below 5% and even more preferably below 2%.

According to certain embodiments, the composition (C) may comprise the copolymer (PEDEK-PEEK) and polymer (PEI), as above detailed, in combination with one or more than one additional polymeric components, such as polyarylether polymers different from copolymer (PEDEK-PEEK), including e.g. PEEK, PEK, PEKK, PEKEKK; polyimide polymers different from polymer (PEI) such as polyamide-imides; sulfone polymers, polyaryl sulphides, and the like, It is nevertheless understood that the composition (C) is typically a composition based on copolymer (PEDEK-PEEK) and polymer (PEI); generally speaking, this means that the combined weight of copolymer (PEDEK-PEEK) and polymer (PEI) exceed the weight amount of any other polymer component, which may possibly be comprised therein.

According to other embodiments, the copolymer (PEDEK-PEEK) and polymer (PEI), as above detailed, are the only polymeric components in the composition (C).

The expression 'polymeric components' is to be understood according to its usual meaning, i.e. encompassing compounds characterized by repeated linked units, having typically a molecular weight of 2 000 or more.

The composition (C) can be prepared by a variety of methods involving intimate admixing of the at least one copolymer (PEDEK-PEEK), at least one polymer (PEI), as above detailed, optionally the reinforcing filler and optionally additional ingredient (I) desired in the polymeric material, for example by dry blending, suspension mixing, slurry mixing, solution mixing, melt mixing and any combination thereof, in particular a combination of dry blending and melt mixing.

Typically, the dry blending of copolymer (PEDEK-PEEK) and polymer (PEI), as detailed above, preferably in powder state, optionally the reinforcing filler and optionally additional ingredient (I), is carried out by using high intensity mixers, such as notably Henschel-type mixers and ribbon mixers so as to obtain a physical mixture, in particular a powder mixture of the at least one copolymer (PEDEK-PEEK) and the at least one polymer (PEI), optionally the reinforcing filler and optionally additional ingredient (I).

Alternatively, the intimate admixing of the at least one copolymer (PEDEK-PEEK), the at least one polymer (PEI), optionally the reinforcing filler and optionally additional ingredient (I) desired in the composition (C), is carried out by tumble blending based on a single axis or multi-axis rotating mechanism so as to obtain a physical mixture.

Alternatively, the slurry mixing of the copolymer (PEDEK-PEEK), the at least one polymer (PEI), optionally the reinforcing filler and optionally additional ingredient (I) is carried out by first slurrying said copolymer (PEDEK-PEEK), and said polymer (PEI) as above detailed, in powder form, optionally the reinforcing filler and optionally additional ingredient (I) using an agitator in an appropriate liquid such as for example methanol, followed by filtering the liquid away, so as to obtain a powder mixture of the at least one copolymer (PEDEK-PEEK), the at least one polymer (PEI), optionally the reinforcing filler and optionally additional ingredient (I).

In another embodiment, the solution mixing of the copolymer (PEDEK-PEEK), the polymer (PEI), as detailed above, optionally the reinforcing filler and optionally additional ingredient (I) is carried out using an agitator in an appropriate solvent, such as for example diphenyl sulfone, or solvent blends.

Following the physical mixing step by one of the aforementioned techniques, the physical mixture, in particular the obtained powder mixture, of the at least one copolymer (PEDEK-PEEK), the at least one polymer (PEI), optionally the reinforcing filler and optionally additional ingredient (I) is typically melt fabricated by known methods in the art including notably melt fabrication processes such as compression molding, injection molding, extrusion and the like, to provide shaped articles, including notably part(s) useful in a variety of fields of use.

So obtained physical mixture, in particular the obtained powder mixture can comprise the copolymer (PEDEK-PEEK), the polymer (PEI), the reinforcing filler, as detailed above, and optionally, other ingredients (I) in the weight ratios as above detailed, or can be a concentrated mixture to be used as masterbatch and diluted in further amounts of the copolymer (PEDEK-PEEK) and polymer (PEI), as above detailed, the reinforcing filler, as detailed above, and optionally, other ingredients (I) in subsequent processing steps. For example, the obtained physical mixture can be extruded into a stock shape like a slab or rod from which a final part can be machined. Alternatively, the physical mixture can be compression or injection molded into a finished part or into a stock shape from which a finished part can be machined.

It is also possible to manufacture the composition of the invention by melt compounding. Composition (C) may be manufactured by further melt compounding the powder mixture as above described. As an alternative, melt compounding may be effected directly on the copolymer (PEDEK-PEEK), polymer (PEI), as above detailed, the reinforcing filler, as detailed above, and optionally, other ingredients (I). In such case, copolymer (PEDEK-PEEK) and polymer (PEI) may be provided in the form of pellets or in the form of powders to be fed to the melt compounding device, with pellets being the preferred form for the sake of ensuring stable feeding. Conventional melt compounding devices, such as co-rotating and counter-rotating extruders, single screw extruders, co-kneaders, disc-pack processors and various other types of extrusion equipment can be used. Preferably, extruders, more preferably, twin screw extruders can be used.

If desired, the design of the compounding screw, e.g. flight pitch and width, clearance, length as well as operating conditions will be advantageously chosen so that sufficient heat and mechanical energy is provided to advantageously fully melt the mixture (e.g. the preformed powder mixture) or the ingredients as above detailed and advantageously obtain a homogeneous distribution of the different ingredients. Provided that optimum mixing is achieved between the bulk polymer and filler contents, it is advantageously possible to obtain strand extrudates of the composition (C) of the invention. Strand extrudates of the composition (C) can be chopped by means e.g. of a rotating cutting knife after some cooling time on a conveyer with water spray. Thus, composition (C) may be provided in the form of pellets or beads, which can then be further used for the manufacture of shaped articles, notably of different shape and size, through different processing techniques.

Composition (C) may be further provided under the form of powders (e.g. by comminuting, milling and/or classifying) or of filaments (e.g. manufactured by extrusion), for use in additive manufacturing, e.g. for being processed by selected laser sintering or fused filament fabrication, In some embodiments, composition (C) may be used for making composite materials, including a polymer matrix made of composition (C) and a plurality of fibres embedded therein. Generally fibers are continuous fibers, which may be provided in the form of strands of unidirectional fibers or as woven or nonwoven mats or fabrics. Composite materials including a matrix of composition (C) may be provided in the form of substantially bi-dimensional materials, e.g., materials having one dimension (thickness or height) that is significantly smaller than the other two dimensions (width and length), such as sheets and tapes. In certain preferred embodiments, the composite material comprising a matrix of composition (C) is selected from the group consisting of:

composite materials comprising one or more than one ply of impregnated fabrics, including but not limited to non-woven fabrics such as mats, multiaxial fabrics, woven fabrics or braided fabrics; and unidirectional (continuous or discontinuous) fiber reinforced tapes or prepregs, preferably where the fibers are aligned; and multi-directional fiber reinforced tapes or prepregs comprising multiple layers of fiber-reinforced tapes or prepregs.

Fabrics and fibers used in the composite materials above described may be of any type; it is nevertheless preferred to use carbon fabrics and fibers, in particular for providing continuous carbon fiber unidirectional tapes or multi-directional fiber reinforced.

Shaped Articles

Another subject matter of the present invention is a shaped article comprising composition (C), as detailed above. The composition (C), as above detailed, can be processed by usual melt processing techniques, including notably extrusion molding, injection molding, and compression molding, so as to provide shaped articles.

The shaped article according to the invention may hence be an extruded shape, preferably selected from the group consisting of a rod, a slab, a tubing, a pipe or a profile or may be an injection molded article.

According to certain embodiments shaped articles are under the form of substantially bi-dimensional articles, e.g. parts wherein one dimension (thickness or height) is significantly less than the other two characterizing dimensions (width and length), such as notably films, sheaths and sheets.

According to other embodiments, shaped articles are provided as three-dimensional parts, e.g. substantially extending in the three dimensions of space in similar manner, including under the form of parts with complex geometries, e.g. with concave or convex sections, possibly including undercuts, inserts, and the like.

Potential applications include various industrial and durable components in automotive, aerospace, semiconductor fabrication, including as electrostatic dissipative (ESD) components for semi-conductors and IC chip manufacturing, electrical-electronics, wire and cable insulation, high performance films, medical and pharmaceutical components.

The ability of the inventive composition to be processed into thin films with no phase segregation or separation is also enabling using composition (C) for the manufacture of ultra-thin films, having thicknesses, for instance, of below 25 µm, which find utility notably as diaphragm membranes for speakers.

According to certain embodiments, shaped articles made from the composition (C), as above detailed, are provided as part(s) of an electrostatic discharge (ESD) protective device, which may, e.g., be designed for being connected to a semiconductor wafer intended for chip manufacture.

Should the disclosure of any patents, patent applications, and publications which are incorporated herein by reference conflict with the description of the present application to the extent that it may render a term unclear, the present description shall take precedence.

The invention will be now be described with reference to the following examples, whose purpose is merely illustrative and not intended to limit the scope of the present invention.

EXAMPLES

Materials Used

The copolymer (PEDEK-PEEK) used in these examples was a copolymer derived from the polycondensation of 4,4'-difluorobenzophenone (DFBP), 4,4'-dihydroxydiphenyl, also known as biphenol, and hydroquinone. The copolymer is rich in biphenol residue moieties relative to hydroquinone moieties within the total stoichiometric amount of the biphenol in the polymerization. PEDEK represents the polymer repeating unit from the polycondensation of biphenol with 4,4'-difluorobenzophenone. While copolymers (PEDEK-PEEK) that can be used in the practice of this invention can vary in the molar proportion of the PEDEK and PEEK repeat units within the polymer backbone, in the examples a copolymer possessing a PEDEK-PEEK mole ratio of 75-25 (PEDEK-PEEK copolymer, hereinafter) has been used. Said PEDEK-PEEK copolymer has a melt viscosity of 310 Pa s at 420° C. and 1000 s$^{-1}$ as measured using a capillary rheometer according to ASTM D3835.

Analogous PEEK-rich PEEK-PEDEK copolymers, rich in PEEK repeat units relative to PEDEK repeat units, were also used for comparative examples. Said PEEK-rich PEEK-PEDEK copolymers (PEEK-PEDEK copolymers, hereafter) used in the comparative examples below have PEEK-PEDEK mole ratios of 70-30 and 80-20 and melt viscosities of 200 Pa·s and 190 Pa·s, respectively, at 370° C. and 1000 s$^{-1}$, as measured using a capillary rheometer according to ASTM D3835.

The polymer (PEI) used was ULTEM 1000 PEI from SABIC. This is a standard grade of PEI for general purpose extrusion and injection molding applications. The manufacturer reports that this grade has a melt flow rate of about 9 g/10 min as measured using a melt index apparatus according to ASTM D1238 at 377° C. and using a 6.6 kg weight.

The PEEK grade used was KetaSpire® KT-820 NT natural resin from Solvay Specialty Polymers USA, LLC. This is a standard grade of PEEK for general purpose extrusion and injection molding applications. It has a melt viscosity in the range of 380-500 Pa·s at 400° C. and 1000 s$^{-1}$ as measured using a capillary rheometer according to ASTM D3835.

Preparation of Fomulations

The polymer blends according to this invention were prepared by melt compounding using a 26 mm Coperion® co-rotating partially intermeshing twin screw extruder having an L/D ratio of 48:1. The extruder had 12 barrel sections with barrel sections 2 through 12 being heated with a temperature setting of 390° C. (for blends of PEDEK-PEEK with PEI), 380° C. (for blends of PEEK with PEI), or 335° C. (for blends of PEEK-PEDEK with PEI). The die temperature was also set at 390° C. (for blends of PEDEK-PEEK with PEI), 380° C. (for blends of PEEK with PEI), or 345° C. (for blends of PEEK-PEDEK with PEI). Different temperature settings were used for melt compounding each of the polyketone resins due to their different melting temperatures and different target ranges for processing conditions. The extruder was operated at a throughput rate of 30 lb/hr (about 13.6 kg/hr) and 200 rpm screw speed, and the extruder torque reading was maintained in the range of about 60-85% during compounding of all the compositions. Vacuum venting with a vacuum level >25 in Hg was applied at barrel section 10 during compounding to strip off moisture and any possible residual volatiles from the compound. The extrudate from each of the runs was stranded and cooled in a water trough and then pelletized into pellets approximately 2.7 mm in diameter and 3.0 mm in length.

Testing of Formulations

Mechanical properties were tested for all the formulations using injection molded 0.125 in (3.2 mm) thick ASTM test specimens, which consisted of 1) Type I tensile bars and 2) 5 in×0.5 in×0.125 in flexural bars. With the exception of PEEK/PEI formulations comprised of 30% or more PEI, injection molded test specimens were annealed in an oven at 230° C. for 2 hours prior to testing. Injection molded test specimens from PEEK/PEI formulations with 30% or more PEI exhibited significant warpage when annealed at 230° C., so these specimens were annealed at 200° C. for 2 hours prior to testing. In order to limit warpage during annealing, the parts were annealed between 2 flat 0.5-inch thickness glass plates.

The following ASTM test methods were employed in evaluating the compositions:

D638: Tensile properties (testing speed=2.0 in/min)
D790: Flexural properties
D256: Notched Izod impact properties Dynamic Mechanical Analysis (DMA) was conducted in torsion mode on injection molded test specimens (cut from the center of an ASTM Type I tensile bar). Dynamic temperature sweeps from 50° C. to 300° C. were performed at a frequency of 10.0 rad/s and a strain amplitude of 0.05%.

Differential Scanning Calorimetry (DSC) was conducted on formulations at different cooling rates in order to assess the effects on the crystallization time of adding PEI to PEEK and to PEDEK-PEEK and PEEK-PEDEK copolymers. DSC tests were conducted in accordance with ASTM method D3418. The crystallization time was calculated according to the following formula:

$$\text{Crystallization Time} = 2 \times \frac{\text{Crystallization peak width at half maximum}}{\text{Cooling rate}}$$

TABLE 1

Mechanical and thermal properties of exemplary formulations of this invention

|  | C1 | E1 | E2 | E3 | E4 | E5 | E6 | C2 |
|---|---|---|---|---|---|---|---|---|
| 75-25 PEDEK-PEEK Copolymer (w %) | 100 | 90 | 80 | 70 | 65 | 60 | 50 | 0 |
| ULTEM ® 1000 PEI (w %) | 0 | 10 | 20 | 30 | 35 | 40 | 50 | 100 |
| Tests |  |  |  |  |  |  |  |  |
| Tensile Strength (psi) | 13900 | 14100 | 14500 | 14900 | 15200 | 15200 | — | 13700 |
| Tensile Modulus (kpsi) | 496 | 523 | 474 | 477 | 503 | 486 | — | 494 |
| Tensile Elongation at Yield (%) | 6.3 | 6.4 | 6.6 | 6.7 | 6.5 | 6.7 | — | 7 |
| Tensile Elongation at Break (%) | 16 | 16 | 17 | 20 | 16 | 14 | — | 51 |
| Flexural Strength (psi) | 20200 | 20100 | 19500 | 20600 | 20300 | 19900 | — | 20700 |
| Flexural Modulus (kpsi) | 508 | 504 | 476 | 493 | 477 | 463 | — | 474 |
| Notched Izod impact strength (ft-lb/in) | 1.09 | 1.1 | 1.35 | 1.4 | 1.59 | 1.7 | — | 1.23 |
| Tensile Strength at 175° C. (psi) | 4300 | 4370 | 5510 | 5360 | 6070 | 6440 | — | — |
| Tensile Modulus at 175° C. (kpsi) | 212 | 296 | 357 | 356 | 401 | 380 | — | — |
| Flexural Strength at 175° C. (psi) | 4100 | 7230 | 7828 | 8470 | 8130 | 8510 | — | — |
| Flexural Modulus at 175° C. (kpsi) | 141 | 325 | 335 | 353 | 345 | 361 | — | — |
| $T_g 1$ from DMA (° C.) | 180.3 | 189.2 | 198.1 | 203.0 | 203.0 | 204.0 | 203.0 | None |
| $T_g 2$ from DMA (° C.) | None | None | None | None | 209.3 | 215.9 | 215.8 | 225.2 |

The tensile and flexural property data in Table 1 demonstrate that the polymer blend compositions according to the invention (E1-E6) exhibit superior strength and stiffness at 175° C. compared to the neat PEDEK-PEEK copolymer control (C1). Additionally, the notched Izod impact data in Table 1 demonstrate that the polymer blend compositions according to the invention (E1-E6) exhibit superior notched Izod impact strength compared to the neat PEDEK-PEEK copolymer control (C1).

TABLE 2

Mechanical and thermal properties of PEEK/PEI blend formulations serving as comparative examples for this invention

|  | C3 | CE1 | CE2 | CE3 | CE4 |
|---|---|---|---|---|---|
| KetaSpire ® KT-820 PEEK (w %) | 100 | 90 | 80 | 70 | 60 |
| ULTEM ® 1000 PEI (w %) | 0 | 10 | 20 | 30 | 40 |
| Tests |  |  |  |  |  |
| Tensile Strength (psi) | 14600 | 14900 | 15300 | 15200 | 15100 |
| Tensile Modulus (kpsi) | 542 | 540 | 534 | 509 | 494 |
| Tensile Elongation at Yield (%) | 5.2 | 5.8 | 5.8 | 5.6 | 5.7 |
| Tensile Elongation at Break (%) | 19 | 24 | 11 | 13 | 14 |
| Flexural Strength (psi) | 22800 | 22300 | 22300 | 21600 | 21400 |
| Flexural Modulus (kpsi) | 577 | 552 | 542 | 512 | 506 |
| Notched Izod impact strength (ft-lb/in) | 1.72 | 1.67 | 1.04 | 1.15 | 1.13 |
| Tensile Strength at 175° C. (psi) | 3460 | 3740 | 3740 | 3700 | 4590 |
| Tensile Modulus at 175° C. (kpsi) | 62 | 127 | 224 | 294 | 353 |
| Flexural Strength at 175° C. (psi) | 2440 | 2840 | 4680 | 4070 | 4570 |
| Flexural Modulus at 175° C. (kpsi) | 58 | 72 | 165 | 159 | 221 |
| $T_g$ from DMA (° C.) | 161.0 | 173.5 | 183.5 | 188.9 | 190.5 |

Considering the tensile and flexural data in Table 2 for comparative examples of PEEK/PEI blends, it is demonstrated that the polymer blend compositions according to the invention exhibit higher strength and stiffness at 175° C. than the analogous PEEK/PEI polymer blends.

Considering the notched Izod impact data in Table 2 for comparative examples of PEEK/PEI blends, we also observe that for PEI concentrations greater than 10 w % the polymer blend compositions according to the invention exhibit higher notched Izod impact strength than the analogous PEEK/PEI polymer blends. Additionally, while the data in Table 2 shows that adding PEI to PEEK lowers the notched Izod impact strength, adding PEI to PEDEK-PEEK copolymer increases the notched Izod impact strength.

The glass transition temperature ($T_g$) data extracted from DMA and reported in Tables 1 and 2 demonstrate that while PEEK/PEI polymer blends exhibit a single $T_g$ for all concentrations examined, indicating full miscibility of the two polymers, some blends of PEDEK-PEEK copolymer with PEI exhibit two $T_g$'s, although slightly diverging from the $T_g$'s of neat PEI or neat PEDEK-PEEK copolymer. This observation indicates partial miscibility of PEI and PEDEK-PEEK copolymer, which is a surprising and beneficial result. Unlike a fully miscible blend, the partially miscible blends retain the higher $T_g$ of the PEI-rich phase, leading to improved high temperature performance. The lower $T_g$ of the partially miscible blends, corresponding to the phase rich in PEDEK-PEEK copolymer, was estimated as the inflection point on an asymmetric shoulder that develops near and before the maximum in the DMA loss tangent vs. temperature curve for PEI concentrations of 35 w % or greater.

TABLE 3

Mechanical properties of blends of PEI with PEEK-PEDEK copolymer serving as comparative examples for this invention

|  | CE5 | CE6 | CE7 | CE8 | CE9 | CE10 |
|---|---|---|---|---|---|---|
| 80-20 PEEK-PEDEK Copolymer (w %) | 100 | 80 | 60 | 0 | 0 | 0 |
| 70-30 PEEK-PEDEK Copolymer (w %) | 0 | 0 | 0 | 100 | 80 | 60 |
| Ultem ® 1000 PEI (w %) | 0 | 20 | 40 | 0 | 20 | 40 |
| Tests |  |  |  |  |  |  |
| Tensile Strength (psi) | 14700 | 15500 | 16000 | 14300 | 15500 | 15800 |
| Tensile Modulus (kpsi) | 518 | 511 | 511 | 495 | 499 | 507 |
| Tensile Elongation at Yield (%) | 5.9 | 5.9 | 6 | 5.6 | 6.1 | 5.9 |
| Tensile Elongation at Break (%) | 16 | 12 | 10 | 13 | 6.4 | 7.8 |
| Flexural Strength (psi) | 22100 | 22400 | 22500 | 21100 | 21800 | 21300 |
| Flexural Modulus (kpsi) | 535 | 518 | 510 | 510 | 511 | 493 |
| Tensile Strength at 175° C. (psi) | 3460 | 3880 | 4380 | 3020 | 3160 | 4090 |
| Tensile Modulus at 175° C. (kpsi) | 72 | 232 | 274 | 64 | 146 | 235 |
| Flexural Strength at 175° C. (psi) | 3060 | 4660 | 8220 | 2710 | 4460 | 7130 |
| Flexural Modulus at 175° C. (kpsi) | 71.6 | 154 | 300 | 65.5 | 140 | 252 |

Table 3 shows mechanical property data for comparative examples consisting of blends of PEI with PEEK-rich PEEK-PEDEK copolymer. For demonstration, blends were formulated consisting of copolymers having 2 different mole ratios of PEEK and PEDEK moieties. It has been shown that for a given PEI concentration, the polymer blend compositions according to the invention exhibit higher strength and stiffness at 175° C. than the comparative blend formulations in Table 3. Additionally, the comparative examples in Table 3 exhibit lower ductility at ambient temperatures than the blends according to the invention, as evidenced by the reduced tensile elongation at break.

Table 4 shows storage modulus measurements from torsion mode DMA tests at temperatures from 180° C. to 200° C. The results indicate that the high-temperature stiffness of a representative polymer blend according to the invention exceeds that of the neat PEDEK-PEEK copolymer control, as well as that of comparative examples of analogous PEEK/PEI blends and analogous blends of PEI with PEEK-PEDEK copolymer. More specifically, while the addition of PEI to PEEK or PEEK-PEDEK causes a modest improvement or even a reduction in stiffness (lower storage modulus), adding PEI to PEDEK-PEEK copolymer enables significantly increasing stiffness in comparable conditions.

TABLE 4

Storage modulus from DMA at elevated temperatures for an exemplary formulation of the invention and comparative examples

|  | C1 | C3 | CE3 | E3 |
|---|---|---|---|---|
| 75-25 PEDEK-PEEK Copolymer (w %) | 100 | 0 | 0 | 70 |
| KetaSpire ® KT-820 PEEK (w %) | 0 | 100 | 70 | 0 |
| Ultem ® 1000 PEI (w %) | 0 | 0 | 30 | 30 |
| Tests |  |  |  |  |
| DMA Storage Modulus, 180° C. (MPa) | 238 | 176 | 339 | 967 |
| SM increase (%) vs control 180° C. | — | — | +92% | +307% |
| DMA Storage Modulus, 190 °° C. (MPa) | 177 | 151 | 78 | 621 |
| SM increase (%) vs control 190° C. | — | — | −48% | +251% |
| DMA Storage Modulus, 200° C. (MPa) | 105 | 137 | 32 | 205 |
| SM increase (%) vs control 200° C. | — | — | −77% | +95% |

|  | CE5 | CE6 | CE7 | CE8 | CE9 | CE10 |
|---|---|---|---|---|---|---|
| 80-20 PEEK-PEDEK Copolymer | 100 | 80 | 60 | 0 | 0 | 0 |
| 70-30 PEEK-PEDEK Copolymer | 0 | 0 | 0 | 100 | 80 | 60 |
| Ultem ® 1000 PEI | 0 | 20 | 40 | 0 | 20 | 40 |
| Tests |  |  |  |  |  |  |
| DMA Storage Modulus, 180° C. (MPa) | 214 | 460 | 605 | 175 | 338 | 522 |
| SM increase (%) vs control 180° C. | — | +115% | +183% | — | +93% | +198% |
| DMA Storage Modulus, 190° C. (MPa) | 169 | 212 | 354 | 139 | 175 | 310 |
| SM increase (%) vs control 190° C. | — | +25% | +110% | — | +26% | +123% |
| DMA Storage Modulus, 200° C. (MPa) | 147 | 130 | 200 | 120 | 110 | 181 |
| SM increase (%) vs control 200 °° C. | — | −12% | +36% | — | −8% | +51% |

TABLE 5

Crystallization temperature and crystallization time from DSC measurements at different cooling rates on formulations exemplary of the invention, as well as controls and comparative examples.

|  | C1 | E2 | E3 |
|---|---|---|---|
| 75-25 PEDEK-PEEK Copolymer (w %) | 100 | 80 | 70 |
| Ultem ® 1000 PEI (w %) | 0 | 20 | 30 |
| Tests |  |  |  |
| Crystallization Temp at 20° C./min (° C.) | 335.8 | 331.9 | 330.2 |
| Tc - Tc(control) at 20° C./min (° C.) | — | -4.0 | -5.7 |
| Crystallization Time at 2° C./min (s) | 681.0 | 586.2 | 571.8 |
| Crystallization Time at 5° C./min (s) | 257.8 | 244.1 | 229.7 |
| Crystallization Time at 10° C./min (s) | 142.6 | 135.4 | 125.2 |
| Crystallization Time at 20° C./min (s) | 79.5 | 78.4 | 72.5 |
| Crystallization Time at 35° C./min (s) | 55.1 | 50.8 | 50.4 |
| Crystallization Time at 50° C./min (s) | 47.5 | 48.4 | 41.7 |
| % Change in XTL time vs control at 2° C./min (%) | — | -13.9 | -16.0 |
| % Change in XTL time vs control at 5° C./min (%) | — | -5.3 | -10.9 |
| % Change in XTL time vs control at 10° C./min (%) | — | -5.1 | -12.2 |
| % Change in XTL time vs control at 20° C./min (%) | — | -1.4 | -8.8 |
| % Change in XTL time vs control at 35° C./min (%) | — | -7.8 | -8.5 |
| % Change in XTL time vs control at 50° C./min (%) | — | 1.7 | -12.4 |

|  | C3 | CE2 | CE3 |
|---|---|---|---|
| KetaSpire ® KT-820 PEEK | 100 | 80 | 70 |
| Ultem ® 1000 PEI | 0 | 20 | 30 |
| Tests |  |  |  |
| Crystallization Temp at 20° C./min (° C.) | 283.7 | 264.3 | 255.8 |
| Tc - Tc(control) at 20° C./min (°° C.) | — | -19.4 | -27.9 |
| Crystallization Time at 2° C./min (s) | 268.8 | 366.0 | 408.6 |
| Crystallization Time at 5° C./min (s) | 120.7 | 226.8 | 209.3 |
| Crystallization Time at 10° C./min (s) | 73.4 | 123.2 | 91.9 |
| Crystallization Time at 20° C./min (s) | 54.3 | 65.9 | 82.3 |
| Crystallization Time at 35° C./min (s) | 44.0 | 52.0 | 101.3 |
| Crystallization Time at 50° C./min (s) | 37.2 | 37.2 | 41.3 |
| % Change in XTL time vs control at 2° C./min (%) | — | 36.2 | 52.0 |
| % Change in XTL time vs control at 5° C./min (%) | — | 87.9 | 73.4 |
| % Change in XTL time vs control at 10° C./min (%) | — | 67.8 | 25.2 |
| % Change in XTL time vs control at 20° C./min (%) | — | 21.3 | 51.5 |
| % Change in XTL time vs control at 35° C./min (%) | — | 18.3 | 130.6 |
| % Change in XTL time vs control at 50° C./min (%) | — | -0.1 | 10.8 |

|  | CE5 | CE6 | CE7 | CE8 | CE9 | CE10 |
|---|---|---|---|---|---|---|
| 80-20 PEEK-PEDEK Copolymer (w %) | 100 | 80 | 60 | 0 | 0 | 0 |
| 70-30 PEEK-PEDEK Copolymer (w %) | 0 | 0 | 0 | 100 | 80 | 60 |
| Ultem ® 1000 PEI (w %) | 0 | 20 | 40 | 0 | 20 | 40 |
| Tests |  |  |  |  |  |  |
| Crystallization Temp at 20° C./min (° C.) | 260.6 | 252.6 | 242.8 | 243.1 | 239.6 | 221.2 |
| Tc - Tc(control) at 20° C./min (° C.) | — | -8.0 | -17.8 | — | -3.5 | -21.9 |
| Crystallization Time at 5° C./min (s) | 124.1 | 153.4 | 263.3 | 186.5 | 270.0 | 388.8 |
| Crystallization Time at 20° C./min (s) | 48.1 | 63.1 | 104.4 | 62.8 | 99.7 | 113.3 |
| Crystallization Time at 35° C./min (s) | 34.8 | 52.8 | 83.1 | 67.5 | 85.5 | No XTL |
| % Change in XTL time vs control at 5° C./min (%) | — | 23.6 | 112.2 | — | 44.8 | 108.5 |
| % Change in XTL time vs control at 20° C./min (%) | — | 31.3 | 117.2 | — | 58.9 | 80.6 |
| % Change in XTL time vs control at 35° C./min (%) | — | 52.0 | 139.1 | — | 26.6 | No XTL |

Table 5 shows crystallization data from DSC for an exemplary formulation according to the invention and for relevant controls and comparative examples. While adding PEI to PEEK significantly decreases the crystallization temperature, making the blends more difficult and time-consuming to process via injection molding, Table 5 surprisingly and advantageously demonstrates that blending PEI with a PEDEK-PEEK copolymer only slightly decreases the crystallization temperature of the neat PEDEK-PEEK copolymer. Furthermore, Table 5 demonstrates that blending PEI with PEEK or PEEK-PEDEK detrimentally increases the crystallization time compared to that of the neat PEEK or PEEK-PEDEK control, even removing evidence of crystallinity altogether under certain conditions. By contrast, adding PEI to PEDEK-PEEK copolymer surprisingly and advantageously decreases the crystallization time. This result indicates that blends of PEDEK-PEEK copolymer with PEI crystallize faster than neat PEDEK-PEEK copolymer. Faster crystallization times are advantageous for efficient injection molding processing.

The invention claimed is:
1. A composition (C) comprising:
   at least one polyaryl ether ketone copolymer, copolymer (PEDEK-PEEK), comprising:
   recurring units ($R_{PEEK}$) of formula (I):

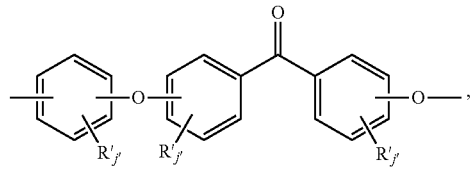

Formula (I)

recurring units ($R_{PEDEK}$) of formula (II):

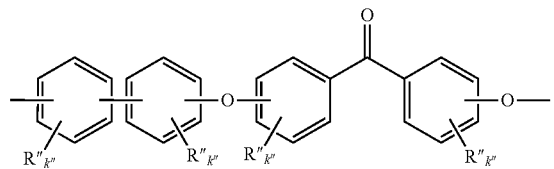

Formula (II)

wherein in above formulae (I) and (II), each of R' and R", equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; each of j' and k", equal to or different from each other, is independently selected at each occurrence from 0 and an integer of 1 to 4; wherein the said recurring units are comprised in a molar ratio ($R_{PEDEK}$):($R_{PEEK}$) of 55:45 to 99:1, and
   at least one poly(ether imide) polymer, polymer (PEI), comprising at least 50 mol. %, based on the total number of moles in the polymer, of recurring units ($R_{PEI}$) comprising (i) at least one aromatic ring, (ii) at least one imide group, in its imide and/or in its amic acid form, and (iii) at least one ether group.

2. The composition of claim 1, wherein the copolymer (PEDEK-PEEK) comprises recurring units ($R_{PEDEK}$) and ($R_{PEEK}$) in molar ratio ($R_{PEDEK}$):($R_{PEEK}$) of 60:40 to 95:5; and/or wherein copolymer (PEDEK-PEEK) additionally comprises recurring units ($R_{PAK}$) different from recurring units ($R_{PEEK}$) and ($R_{PEDEK}$), wherein the amount of recurring units (RPAEK) is between 0 and 5% moles, with respect to the total number of moles of recurring units of copolymer (PEDEK-PEEK), and/or wherein said recurring units ($R_{PAEK}$) comply with any of the following formulae (K-A) to (K-M) herein below:

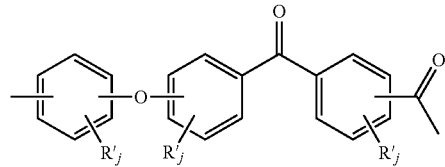
(K-A)

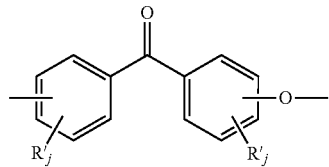
(K-B)

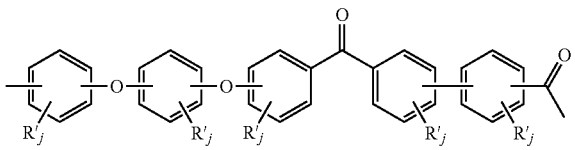
(K-C)

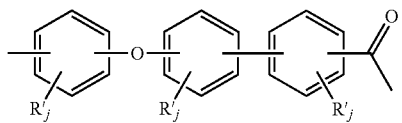
(K-D)

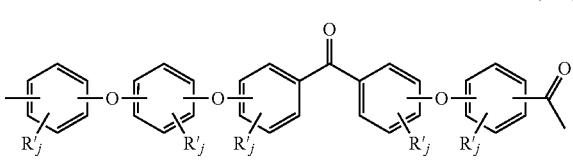
(K-E)

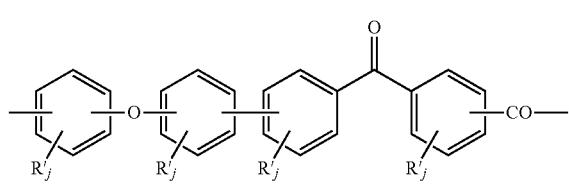
(K-F)

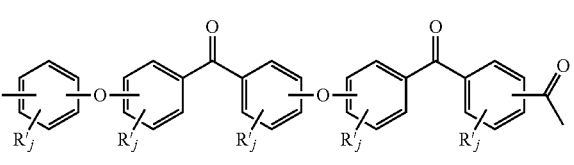
(K-G)

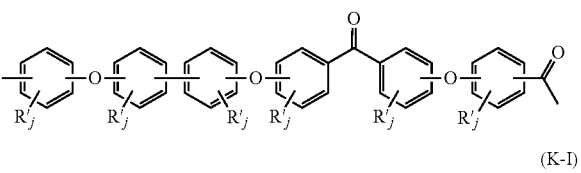
(K-H)

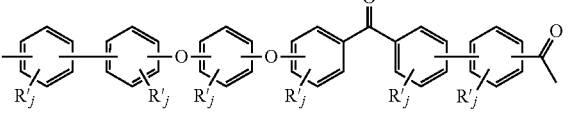
(K-I)

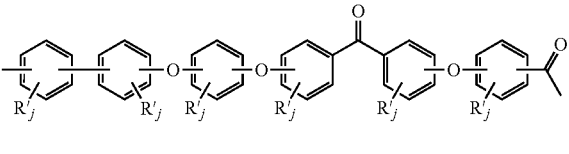
(K-J)

(K-K)

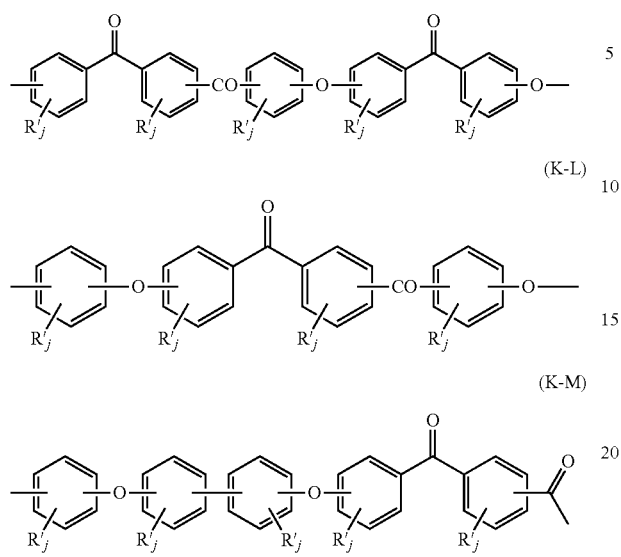

(K-L)

(K-M)

wherein in each of formulae (K-A) to (K-M) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4.

3. The composition (C) according to claim 1, wherein in the copolymer (PEDEK-PEEK), in recurring units ($R_{PEEK}$) of formula (I), the connections among phenyl groups are generally in the para positions of each of the phenyl rings and/or each of j' is zero, and wherein in recurring units ($R_{PEDEK}$) of formula (II), the connections among phenyl groups are generally in the para positions of each of the phenyl rings and/or each of k" is zero.

4. The composition according to claim 1, wherein the recurring units ($R_{PEI}$) of polymer (PEI) are selected from the group consisting of the following formulas (I), (II), (III), (IV), (V) and mixtures thereof:

(I)

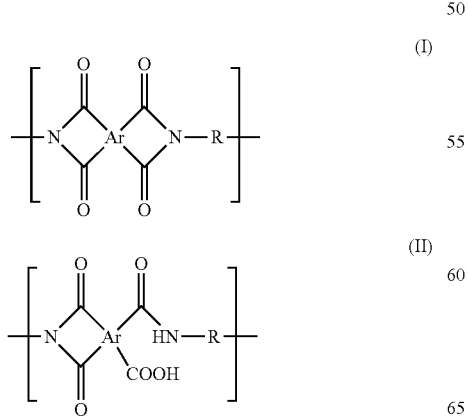

(II)

(III)

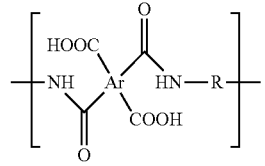

(IV)

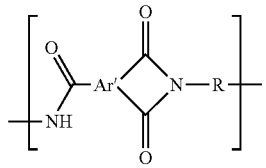

(V)

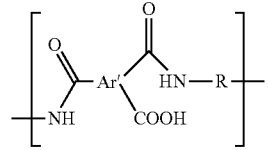

wherein
Ar is a tetravalent aromatic moiety and is selected from the group consisting of a substituted or unsubstituted, saturated, unsaturated or aromatic monocyclic and polycyclic group having 5 to 50 carbon atoms;
Ar' is a trivalent aromatic moiety and is selected from the group consisting of a substituted, unsubstituted, saturated, unsaturated, aromatic monocyclic and aromatic polycyclic group having from 5 to 50 C atoms; and
R is selected from the group consisting of substituted and unsubstituted divalent organic radicals, selected from the group consisting of
(a) aromatic hydrocarbon radicals having 6 to 20 carbon atoms and halogenated derivatives thereof,
(b) straight or branched chain alkylene radicals having 2 to 20 carbon atoms;
(c) cycloalkylene radicals having 3 to 20 carbon atoms, and
(d) divalent radicals of formula (VI):

(VI)

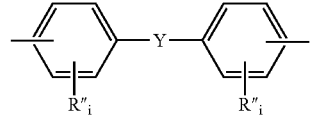

wherein
Y is selected from the group consisting of alkylenes of 1 to 6 carbon atoms; perfluoroalkylenes of 1 to 6 carbon atoms; cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and
R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium, and i, for each R", is independently zero or an integer ranging from 1 to 4, with the proviso that at least one of Ar, Ar' and R comprise at least one ether group and that the ether group is present in the polymer chain backbone.

5. The composition according to claim 4, wherein:

(A) the recurring units ($R_{PEI}$) of polymer (PEI) are selected from the group consisting of formulae (I), (II), (III), and mixture thereof and wherein, in said formulae, Ar is selected from the group consisting of formulae:

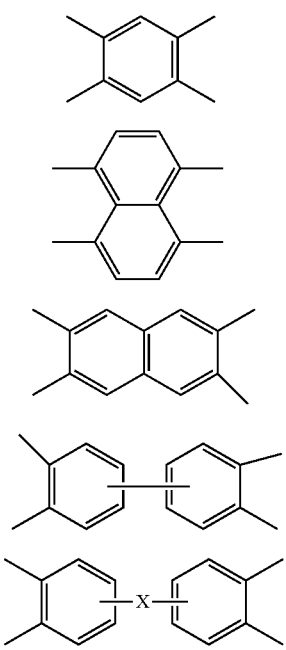

(VII)

(VIII)

(IX)

(X)

(XI)

wherein

X is a divalent moiety, having divalent bonds in the 3,3', 3,4', 4,3" or the 4,4' positions and is selected from the group consisting of alkylenes of 1 to 6 carbon atoms; perfluoroalkylenes of 1 to 6 carbon atoms; cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—; or X is a group of the formula —O—Ar"—O—, wherein Ar" is an aromatic moiety selected from the group consisting of a substituted or unsubstituted, saturated, unsaturated or aromatic monocyclic and polycyclic group having 5 to 50 carbon atoms; or (B) the recurring units ($R_{PEI}$) of polymer (PEI) are selected from the group consisting of formulae (IV) and (V), and mixture thereof and wherein, in said formulae, Ar' is selected from the group consisting of formulae:

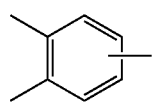

(XII)

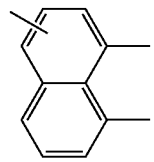

(XIII)

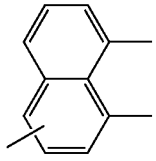

(XIV)

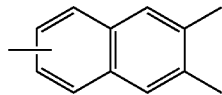

(XV)

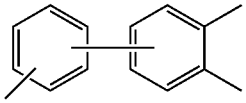

(XVI)

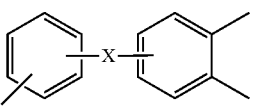

(XVII)

wherein

X is a divalent moiety, having divalent bonds in the 3,3', 3,4', 4,3" or the 4,4' positions and is selected from the group consisting of alkylenes of 1 to 6 carbon atoms; perfluoroalkylenes of 1 to 6 carbon atoms; cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;

or X is a group of the formula —O—Ar"—O—, wherein Ar" is an aromatic moiety selected from the group consisting of a substituted or unsubstituted, saturated, unsaturated or aromatic monocyclic and polycyclic group having 5 to 50 carbon atoms.

6. The composition according to claim 1, wherein polymer (PEI) is a polymer comprising at least 50 mol. %, based on the total number of moles in the polymer, of recurring units ($R_{PEI}$) of formula (VII):

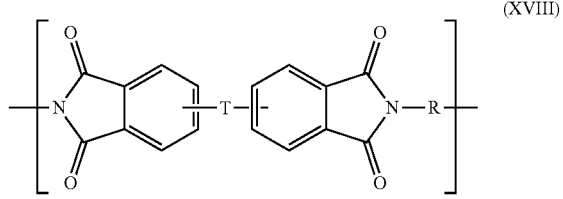

(XVIII)

wherein

R is selected from the group consisting of substituted and unsubstituted divalent organic radicals, selected from the group consisting of
(a) aromatic hydrocarbon radicals having 6 to 20 carbon atoms and halogenated derivatives thereof,
(b) straight or branched chain alkylene radicals having 2 to 20 carbon atoms;
(c) cycloalkylene radicals having 3 to 20 carbon atoms, and (d) divalent radicals of formula (VI):

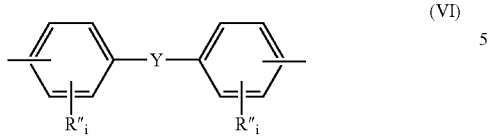

wherein
Y is selected from the group consisting of alkylenes of 1 to 6 carbon atoms; perfluoroalkylenes of 1 to 6 carbon atoms; cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium, and i, for each R", is independently zero or an integer ranging from 1 to 4, with the proviso that at least one of Ar, Ar' and R comprise at least one ether group and that the ether group is present in the polymer chain backbone, T is —O— or —O—Ar"—O— wherein Ar" is an aromatic moiety selected from the group consisting of a substituted or unsubstituted, saturated, unsaturated or aromatic monocyclic and polycyclic group having 5 to 50 carbon atoms.

7. The composition according to claim 1, wherein polymer (PEI) is a polymer comprising at least 50 mol. %, based on the total number of moles in the polymer, of recurring units ($R_{PEI}$) of formulas (XXIII) or (XXIV), in imide forms, or their corresponding amic acid forms and mixtures thereof:

weight of the copolymer (PEDEK-PEEK) and polymer (PEI);

polymer (PEI) in a weight amount of less than 50% based on the combined weight of the copolymer (PEDEK-PEEK) and polymer (PEI); and/or in a weight amount of at least 5% based on the combined weight of the copolymer (PEDEK-PEEK) and polymer (PEI), and/or wherein composition (C) comprises copolymer (PEDEK-PEEK) in an amount of 60 to 90% and polymer (PEI) in an amount of 10 to 40%, based on the combined weight of the copolymer (PEDEK-PEEK) and polymer (PEI).

9. The composition according to claim 1, wherein the composition (C) comprises the copolymer (PEDEK-PEEK) and polymer (PEI) in a combined weight amount of at least 90% based on the total weight of the said composition (C).

10. The composition (C) according to claim 1, said composition (C) comprising at least one reinforcing filler selected from fibrous and particulate fillers, wherein said reinforcing filler is selected from mineral fillers, glass fibers, carbon fibers, synthetic polymeric fiber, aramid fiber, aluminum fiber, titanium fibers, magnesium fibers, boron carbide fibers, rockwool fibers, steel fibers, wollastonite, nanomaterials, and optionally one or more than one additional ingredient (I) different from the reinforcing filler and from the copolymer (PEDEK-PEEK) and from the polymer (PEI), selected from the group consisting of (i) colorants (ii) pigments (iii) light stabilizers (iv) heat stabilizers (v) antioxidants (vi) acid scavengers (vii) processing aids (viii) crystallization nucleating agents (ix) internal lubricants and/or external lubricants (x) flame retardants (xi) smoke-suppressing agents (x) anti-static agents (xi) anti-blocking agents (xii) conductivity additives (xiii) plasticizers (xiv) flow modifiers (xv) extenders (xvi) metal deactivators and combinations comprising one or more of the foregoing additives;

wherein the weight of said reinforcing filler is below 60% wt. based on the total weight of the composition (C); and/or

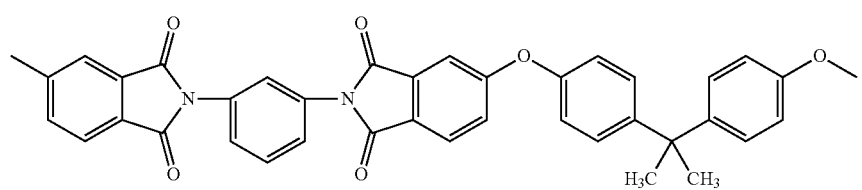

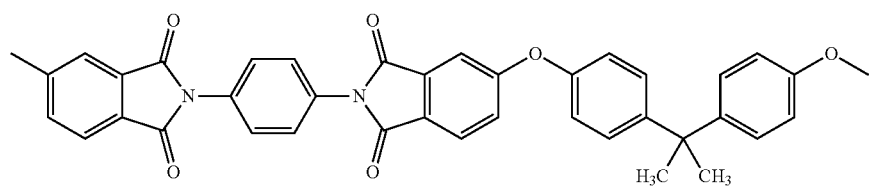

8. The composition (C) according to claim 1, wherein the said composition (C) comprises:

copolymer (PEDEK-PEEK) in a weight amount of more than 50%, based on the combined weight of the copolymer (PEDEK-PEEK) and polymer (PEI); and/or in a weight amount of at most 95% based on the combined wherein the reinforcing filler is present in an amount ranging from 10 to 60% wt. based on the total weight of the composition (C).

11. A method of making the composition (C) according to claim 1, said method comprising admixing of the at least one copolymer (PEDEK-PEEK), at least one polymer (PEI).

12. A composite material comprising a matrix of composition (C) according to claim 1, which is selected from the group consisting of:
  composite materials comprising one or more than one ply of impregnated fabrics; and
  unidirectional (continuous or discontinuous) fiber reinforced tapes or prepregs; and
  multi-directional fiber reinforced tapes or prepregs comprising multiple layers of fiber-reinforced tapes or prepregs.

13. A shaped article comprising the composition (C) according to claim 1.

14. The shaped article according to claim 13, said article being an extruded shape, selected from the group consisting of a rod, a slab, a tubing, a pipe or a profile.

15. The shaped article according to claim 13, said article being an injection molded article.

16. The method of claim 11, further comprising at least one of dry blending, suspension mixing, slurry mixing, solution mixing, melt mixing and any combination thereof.

17. The method of claim 16, comprising a combination of dry blending and melt mixing.

18. The composition (C) according to claim 2, wherein recurring units ($R_{PEEK}$) comply with formula (Ia):

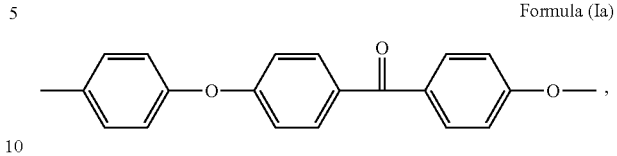

Formula (Ia)

and
  wherein recurring units ($R_{PEDEK}$) comply with formula (IIb):

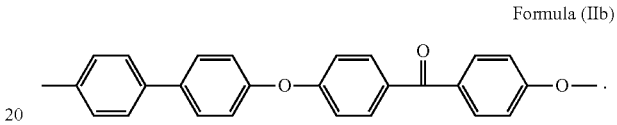

Formula (IIb)

* * * * *